United States Patent
Shirasaka et al.

(10) Patent No.: US 7,852,448 B2
(45) Date of Patent: Dec. 14, 2010

(54) LIQUID CRYSTAL DISPLAY DEVICE

(75) Inventors: Yasuhiro Shirasaka, Kanagawa (JP); Kazuya Ueda, Kumamoto (JP); Yoshiki Nakamura, Kanagawa (JP); Yumiko Tatemori, Kangawa (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 11/756,887

(22) Filed: Jun. 1, 2007

(65) Prior Publication Data
US 2008/0111964 A1    May 15, 2008

(30) Foreign Application Priority Data
Jun. 8, 2006    (JP) .............. 2006-159204

(51) Int. Cl.
G02F 1/1339    (2006.01)
G02F 1/1335    (2006.01)
(52) U.S. Cl. .......................... 349/155; 349/5
(58) Field of Classification Search ............. 349/155
See application file for complete search history.

(56) References Cited

U.S. PATENT DOCUMENTS

| | | | | |
|---|---|---|---|---|
| 5,338,240 A | * | 8/1994 | Kim ................ | 445/24 |
| 5,379,139 A | * | 1/1995 | Sato et al. ........ | 349/155 |
| 7,342,636 B2 | * | 3/2008 | Lee et al. ........ | 349/156 |
| 2004/0196421 A1 | * | 10/2004 | Hwang ............. | 349/114 |
| 2006/0082692 A1 | * | 4/2006 | Kamijima et al. ... | 349/5 |
| 2006/0109390 A1 | * | 5/2006 | Liang ............. | 349/5 |

FOREIGN PATENT DOCUMENTS

| | | | |
|---|---|---|---|
| JP | 02201424 A | * | 8/1990 |
| JP | 05066410 A | * | 3/1993 |
| JP | 2004-177848 | | 6/2004 |
| KR | 1020040034899 A | * | 4/2004 |

* cited by examiner

Primary Examiner—Michelle R Connelly Cushwa
(74) Attorney, Agent, or Firm—SNR Denton US LLP

(57) ABSTRACT

A liquid crystal display device includes a drive substrate, a counter substrate, a spacer, a liquid crystal layer, and an aperture pattern. The drive substrate is configured to have arranged pixel electrodes. The counter substrate is configured to have a counter electrode common to a plurality of pixels. The spacer is configured to have a column shape and be interposed between the drive substrate and the counter substrate that are so disposed that the pixel electrodes and the counter electrode face each other. The liquid crystal layer is configured to be provided and sealed between the drive substrate and the counter substrate. The aperture pattern in which the spacer is enclosed is provided in the counter electrode.

8 Claims, 7 Drawing Sheets

A-A' d = 1.0μm
r = 1.5μm
a1, a2, a3, a4 = 4.45μm

—o m: LIQUID CRYSTAL MOLECULE

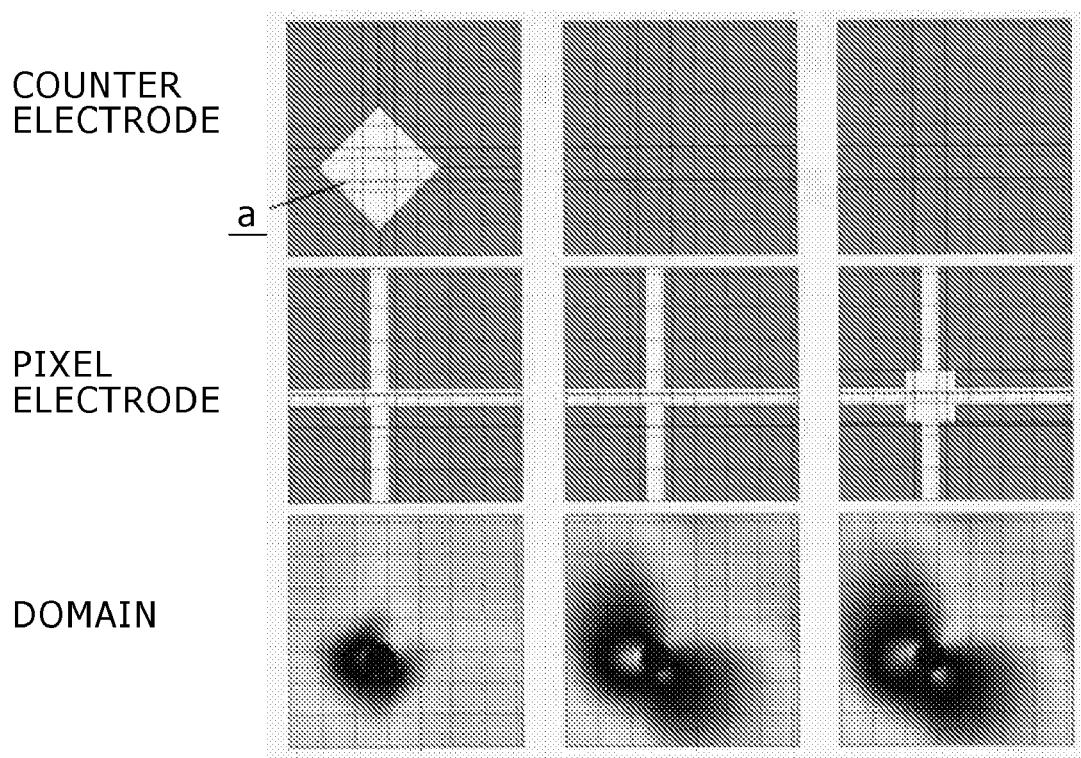

LIQUID CRYSTAL DISPLAY DEVICE

CROSS REFERENCES TO RELATED APPLICATIONS

The present invention contains subject matter related to Japanese Patent Application JP 2006-159204 filed with the Japan Patent Office on Jun. 8, 2006, the entire contents of which being incorporated herein by reference.

BACKGROUND OF THE INVENTION

1. Field of the Invention

The present invention relates to liquid crystal display devices, and particularly to a liquid crystal display device in which column spacers are interposed between substrates.

2. Description of the Related Art

In a typical active-matrix liquid crystal display device, a liquid crystal layer is provided and sealed between a pair of substrates facing each other. One of the pair of substrates is a TFT array substrate over which a large number of scan lines and signal lines are horizontally and vertically arranged and a large number of pixel electrodes and thin film transistors (TFTs) are provided corresponding to the respective intersections between the scan lines and the signal lines. Over the other of the pair of substrates, a counter electrode is provided. Furthermore, in order to achieve a uniform gap (substrate distance) between the substrates opposed to each other, column spacers are interposed between the substrates.

The active-matrix liquid crystal display device employs 1H-inversion driving, in which the polarity of writing is inverted on each line basis, or 1F-inversion driving, in which image signals with the same polarity are written in each one field. It is known that in the 1F-inversion driving, because voltages with the same sign are applied to all the pixel electrodes, the influence of a lateral electric field between the pixel electrodes is absent and thus a transmittance decrease and light leakage due to disclination (disturbance in liquid crystal alignment) can be suppressed.

However, it has been found that even when the 1F-inversion driving is employed, the disturbance in liquid crystal alignment arises in the periphery of column spacers. To address this, there has been proposed a configuration in which areas on which no pixel electrode is formed are provided in the peripheries of column spacers. According to this proposal, in this configuration, external light incident on the pixel electrode (reflective film) part around the column spacer is not reflected, which can avoid the occurrence of light leakage in this part at the time of black displaying (see Japanese Patent Laid-open No. 2004-177848 (Paragraphs 0027 and 0029 in particular, hereinafter Patent document 1)).

SUMMARY OF THE INVENTION

The above-described disturbance of liquid crystal alignment around column spacers will occur, not only in the configuration of Patent document 1, in which a reflective film is used as pixel electrodes. When both pixel electrodes and a counter electrode are optically transparent for example, a transmittance decrease is caused due to such disturbance of liquid crystal alignment around column spacers.

There is a need for the present invention to provide a liquid crystal display device of which displaying performance can be prevented from being lowered due to disturbance of liquid crystal alignment around column spacers.

According to an embodiment of the present invention, there is provided a liquid crystal display device that includes a drive substrate having arranged pixel electrodes and a counter substrate having a counter electrode common to a plurality of pixels. The liquid crystal display device also includes a spacer having a column shape and interposed between the drive substrate and the counter substrate, and a liquid crystal layer provided and sealed between the drive substrate and the counter substrate. In particular, an aperture pattern in which the spacer is enclosed is provided in the counter electrode.

In the liquid crystal display device having this configuration, due to the provision of the aperture pattern in the counter electrode, which is formed as a blanket film in general, electric field distribution arises in the vicinity of the aperture, which can control the liquid crystal alignment and suppress disturbance in the alignment. Because the spacer is enclosed in the aperture pattern, the peripheral part of the spacer is turned to a part having no effect on the pixel displaying.

As described above, according to the embodiment of the present invention, disturbance in liquid crystal alignment around the spacer is suppressed, which can prevent adverse effects on the pixel displaying due to the disturbance. Thus, the displaying performance of the liquid crystal display device can be enhanced.

BRIEF DESCRIPTION OF THE DRAWINGS

FIGS. 4A to 4C are diagrams showing results of simulation of transmissive displaying (domain) when a voltage is applied between a pixel electrode and a counter electrode;

DETAILED DESCRIPTION OF THE PREFERRED EMBODIMENTS

Liquid crystal display devices according to embodiments of the present invention will be described in detail below with reference to the accompanying drawings.

First Embodiment

Figure 1A:
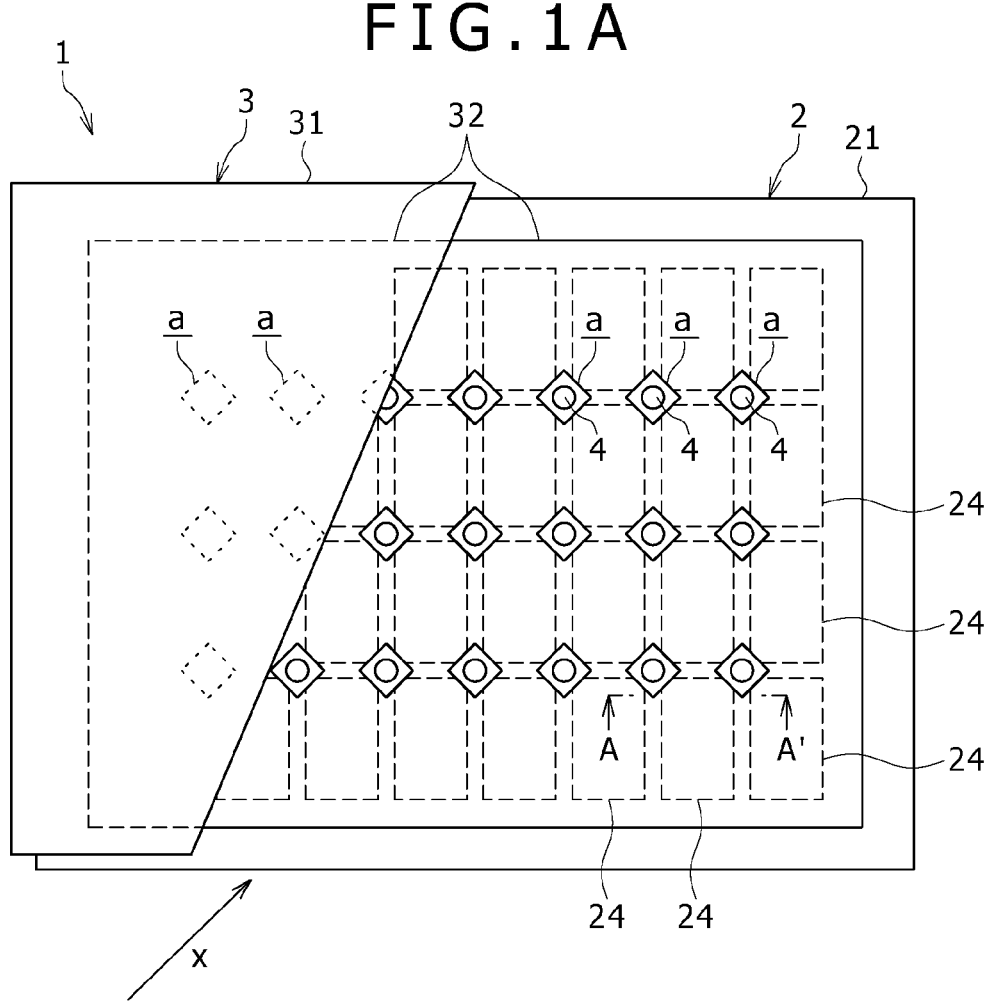
FIG. 1A is a partially cutaway plan view for explaining the schematic configuration of a liquid crystal display device according to a first embodiment of the present invention.
Figure 1B:
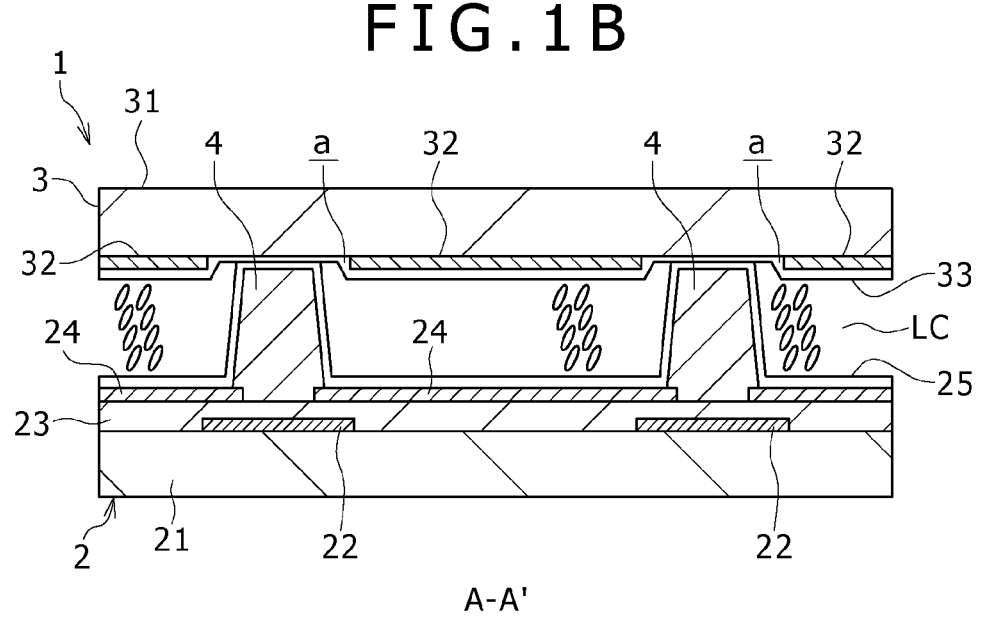
FIG. 1B is a sectional view along the line A-A' in FIG. 1A.

FIG. 1A is a partially cutaway schematic plan view showing major part of a liquid crystal display device according to a first embodiment of the present invention. FIG. 1B is a sectional view along the line A-A' in FIG. 1A. As shown in these drawings, a liquid crystal display device 1 of the first embodiment is a transmissive liquid crystal display device in which spacers 4 having a column shape (hereinafter, referred to as column spacers 4) and a liquid crystal layer LC are interposed between a drive substrate 2 and a counter substrate 3 opposed to each other.

The drive substrate 2 is formed by providing plural scan lines and signal lines and pixel circuits that include thin film transistors provided at the respective intersections between the scan lines and the signal lines and so on (the scan lines, signal lines, and pixel circuits are not shown in the drawings) over a transparent substrate composed of an optically transparent material such as quartz, glass, or plastic. On the transparent substrate, a light-shielding pattern 22 (shown only in the sectional view) formed by using the layer of the pixel circuits is provided as a black matrix covering the spaces among the pixels. Furthermore, on an insulating film 23 (shown only in the sectional view) that covers the pixel circuits, plural pixel electrodes 24 connected to the pixel circuits are arranged in a matrix. The pixel electrodes 24 are formed by patterning a transparent conductive material film such as an ITO film into rectangular shapes, and are arranged along the extension direction of the sides of the rectangular shapes.

In the present embodiment, the column spacers 4 are provided upright over the transparent substrate of the drive substrate 2. It is preferable that the column spacers 4 be provided among the pixel electrodes 24. The column spacer 4 may be so disposed that an end thereof overlaps with the pixel electrode 24. It is unnecessary that the column spacers 4 are disposed on all the areas among the pixel electrodes 24 as shown in FIG. 1(*a*). It is sufficient that the column spacers 4 are uniformly disposed as long as the distance (gap) between the drive substrate 2 and the counter substrate 3 is kept uniform across the substrate plane. In the present embodiment, the gap between the substrates 2 and 3 is so kept that the liquid crystal layer LC between the substrates 2 and 3 obtains a phase difference of $\lambda/2$ when a voltage is applied thereto.

Over the transparent substrate of the drive substrate 2, an alignment layer 25 (shown only in the sectional view) is provided in such a manner as to cover the pixel electrodes 24 and the column spacers 4. The alignment layer 25 is a vertical alignment layer formed by oblique evaporation from the direction (alignment direction x) at an angle of 45° with respect to the sides of the rectangular shapes as the planar shapes of the pixel electrodes 24 as shown by the arrowhead in the plan view. This alignment layer 25 is composed of e.g. a silicon oxide (SiOx).

The counter substrate 3 is formed by providing a counter electrode 32 formed of a transparent conductive film such as an ITO film on the surface, facing the drive substrate 2, of a transparent substrate 31 composed of an optically transparent material such as quartz, glass, or plastic. Furthermore, an alignment layer 33 (shown only in the sectional view) is formed to cover the counter electrode 32.

The counter electrode 32 is provided as a common electrode for supplying a voltage common to all the pixels, and the feature thereof is that aperture patterns a in which the column spacers 4 are enclosed are provided therein. That is, the column spacers 4 are provided inside the aperture patterns a arising from removal of the counter electrode 32.

Figure 2:
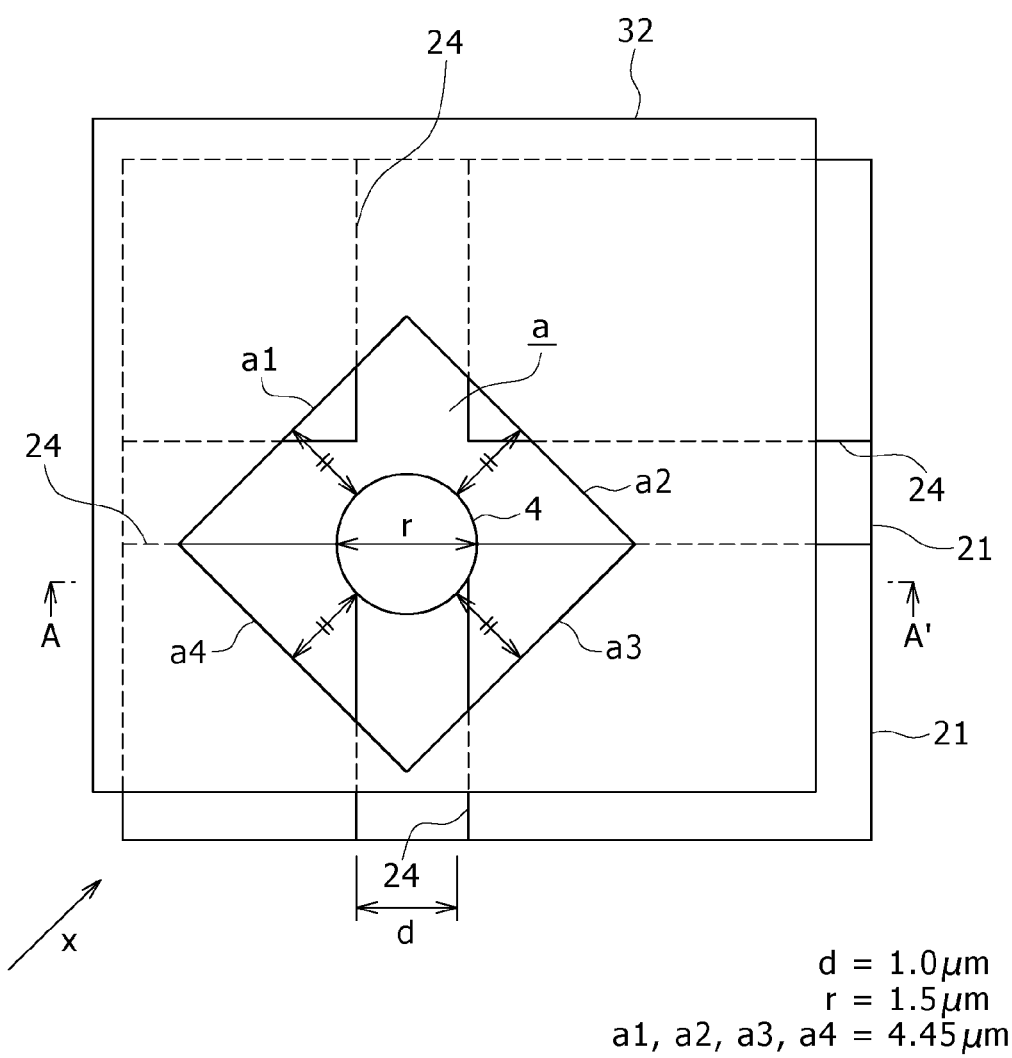
FIG. 2 is an enlarged plan view of major part of the liquid crystal display device according to the first embodiment.

FIG. 2 is an enlarged plan view showing a part around one aperture pattern a. As shown in this drawing, the aperture pattern a is so provided that the column spacer 4 is positioned at the center of the aperture. That is, it is preferable that the column spacer 4 be disposed at the center of the aperture pattern a. A part of the column spacer 4 may be outside the aperture pattern a.

Furthermore, it is preferable that the aperture pattern a be formed into a substantially rectangular shape or substantially square shape formed of sides a1, a2, a3, and a4 that are substantially perpendicular or substantially parallel to the alignment direction x of the alignment layer 25 covering the pixel electrodes 24 (see FIG. 1B). This feature can improve the displaying performance more effectively as described later.

The aperture pattern a may overlap with an end of the pixel electrode 24, and thus the end of the pixel electrode 24 may be exposed inside the aperture pattern a. However, it is preferable that the aperture pattern a be provided in a range overlapping with the light-shielding pattern 22 provided in the drive substrate 2 (see FIG. 1B). As described above, when the pixel electrodes 24 and 24 are arranged to have a distance d therebetween, the diameter r of the column spacer 4 may be larger than the distance d.

The alignment layer 33, which covers the counter electrode 32 having the aperture patterns a, is a vertical alignment layer that is antiparallel to the alignment layer 25 provided in the drive substrate 2. The alignment layer 33 is formed by oblique evaporation of a silicon oxide (SiOx).

The liquid crystal layer LC, which is interposed between the drive substrate 2 and the counter substrate 3 having the above-described configurations, is composed of liquid crystal molecules having negative permittivity anisotropy and is formed as an optical modulation layer. This liquid crystal layer LC is sealed between the substrates 2 and 3 by a sealing resin (not shown) interposed between the peripheral edges of the substrates 2 and 3.

The liquid crystal panel formed by interposing the column spacers 4 and the liquid crystal layer LC between the drive substrate 2 and the counter substrate 3 as described above is interposed between polarizers (not shown) so as to be used as the liquid crystal display device 1. The polarizers are so disposed on both the sides of the liquid crystal panel that the transmission axes thereof are laid in a crossed-Nicols state.

In the liquid crystal display device 1 having such a configuration, when no voltage is applied between the pixel electrode 24 and the counter electrode 32, the liquid crystal molecules of the liquid crystal layer LC are vertically aligned. Therefore, light that has passed through the input-side polarizer goes through the liquid crystal layer LC as it is, and then is absorbed by the output-side polarizer, which results in black displaying. In contrast, when a voltage is applied between the pixel electrode 24 and the counter electrode 32, the liquid crystal molecules of the liquid crystal layer LC are inclined toward the alignment direction x, so that the liquid crystal layer LC obtains a phase difference of $\lambda/2$. Consequently, light that has passed through the input-side polarizer is rotated by 90° in the liquid crystal layer LC and then passes through the output-side polarizer, which results in white displaying.

Figure 3B:
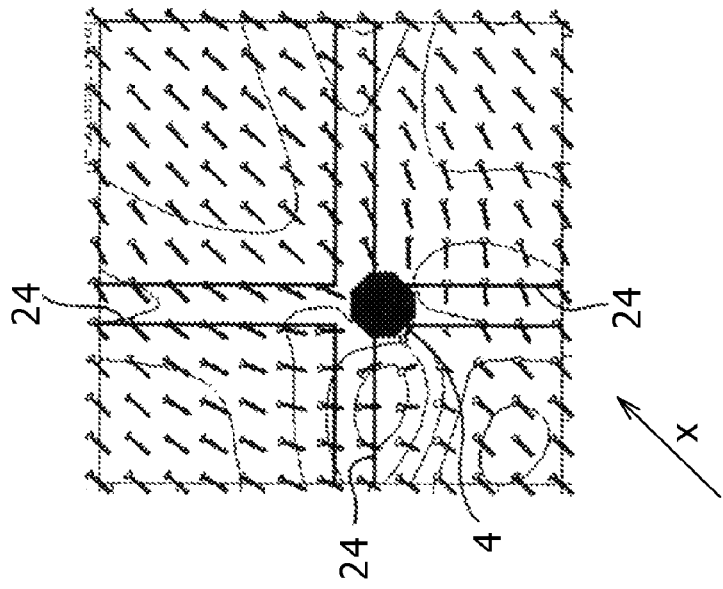
FIGS. 3A and 3B are diagrams showing results of simulation of the alignment direction of liquid crystal molecules m when a voltage is applied between a pixel electrode and a counter electrode.
Figure 3A:
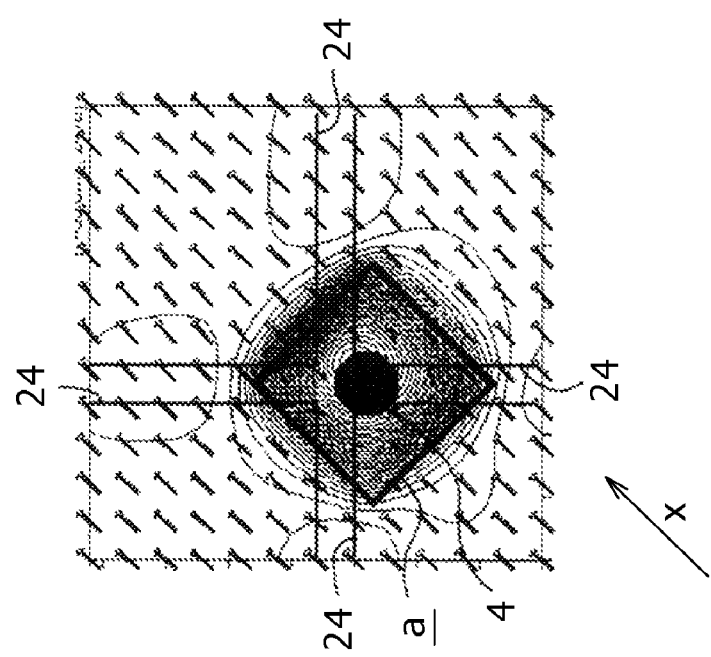

FIGS. 3A and 3B show results of simulation of the alignment direction of liquid crystal molecules m when a voltage is applied between a pixel electrode and a counter electrode. FIG. 3A shows a result of the case where the counter electrode is provided with the aperture pattern a based on the planar configuration described with FIG. 2 according to the first embodiment. FIG. 3B shows a result of the case where the counter electrode is formed as a blanket film. The condition for the simulation of FIG. 3B is as follows (see FIG. 2). The distance d between the pixel electrodes 24 is 1.0 μm. The diameter r of the column spacer 4 is 1.5 μm. The size of the aperture pattern a (the length of four sides a1, a2, a3, and a4) is 4.45 μm. The column spacer 4 is positioned at the center of the aperture pattern a. Simulation results on equipotential lines are also shown in FIGS. 3A and 3B.

The equipotential lines of FIGS. 3A and 3B prove that due to the provision of the aperture pattern a in the counter electrode 32 (FIG. 3A)), the electric field applied between the substrates (to the liquid crystal layer) and the alignment state of the liquid crystal molecules m change from those when the counter electrode is formed as a blanket film (FIG. 3B).

In particular, the results prove that in FIG. 3A, the alignment direction of the liquid crystal molecules m around the column spacer 4 is effectively matched with the alignment direction x of the alignment layer compared with in FIG. 3B. Thus, it is confirmed that an effect of matching of the alignment direction of the liquid crystal molecules m around the column spacer 4 with the alignment direction x of the alignment layer can be achieved by, as described with FIG. 2, providing the aperture pattern a that has a substantially rectangular shape or substantially square shape formed of the sides a1, a2, a3, and a4 substantially perpendicular or substantially parallel to the alignment direction x of the alignment layer, and disposing the column spacer 4 at the center of the aperture pattern a.

FIGS. 4A to 4C show results of simulation of transmissive displaying (domain) when a voltage is applied between a pixel electrode and a counter electrode. FIG. 4A shows a result of the case where the counter electrode is provided with the aperture pattern a based on the planar configuration described with FIG. 2 according to the first embodiment. FIG. 4B shows a result of the case where the counter electrode is formed as a blanket film. FIG. 4C shows a result of the configuration disclosed in Patent document 1, in which the counter electrode is formed as a blanket film and the pixel electrode is removed at the formation position of a column spacer. The condition for the simulation of FIG. 3A is as follows (see FIG. 2). The distance d between the pixel electrodes 24 is 1.0 µm. The diameter r of the column spacer 4 is 1.5 µm. The size of the aperture pattern a (the length of four sides a1, a2, a3, and a4) is 4.45 µm. The column spacer 4 is positioned at the center of the aperture pattern a.

These results of FIGS. 4A to 4C prove that in the configuration of the first embodiment, in which the aperture pattern a is provided in the counter electrode (FIG. 4A), the occurrence of a displaying defect region (domain) involving a transmittance decrease is suppressed compared with in the case where the counter electrode is formed as a blanket film (FIG. 4B) and the configuration of Patent document 1 (FIG. 4C).

Therefore, in the liquid crystal display device 1 having the above-described configuration, due to the provision of the aperture pattern a in the counter electrode 32, which is formed as a blanket film in general, electric field distribution arises in the vicinity of the aperture, which can control the liquid crystal alignment and suppress disturbance in the alignment. Because the column spacer 4 is enclosed in the aperture pattern a, the peripheral part of the column spacer 4 is turned to a part having no effect on the pixel displaying.

Figure 5:
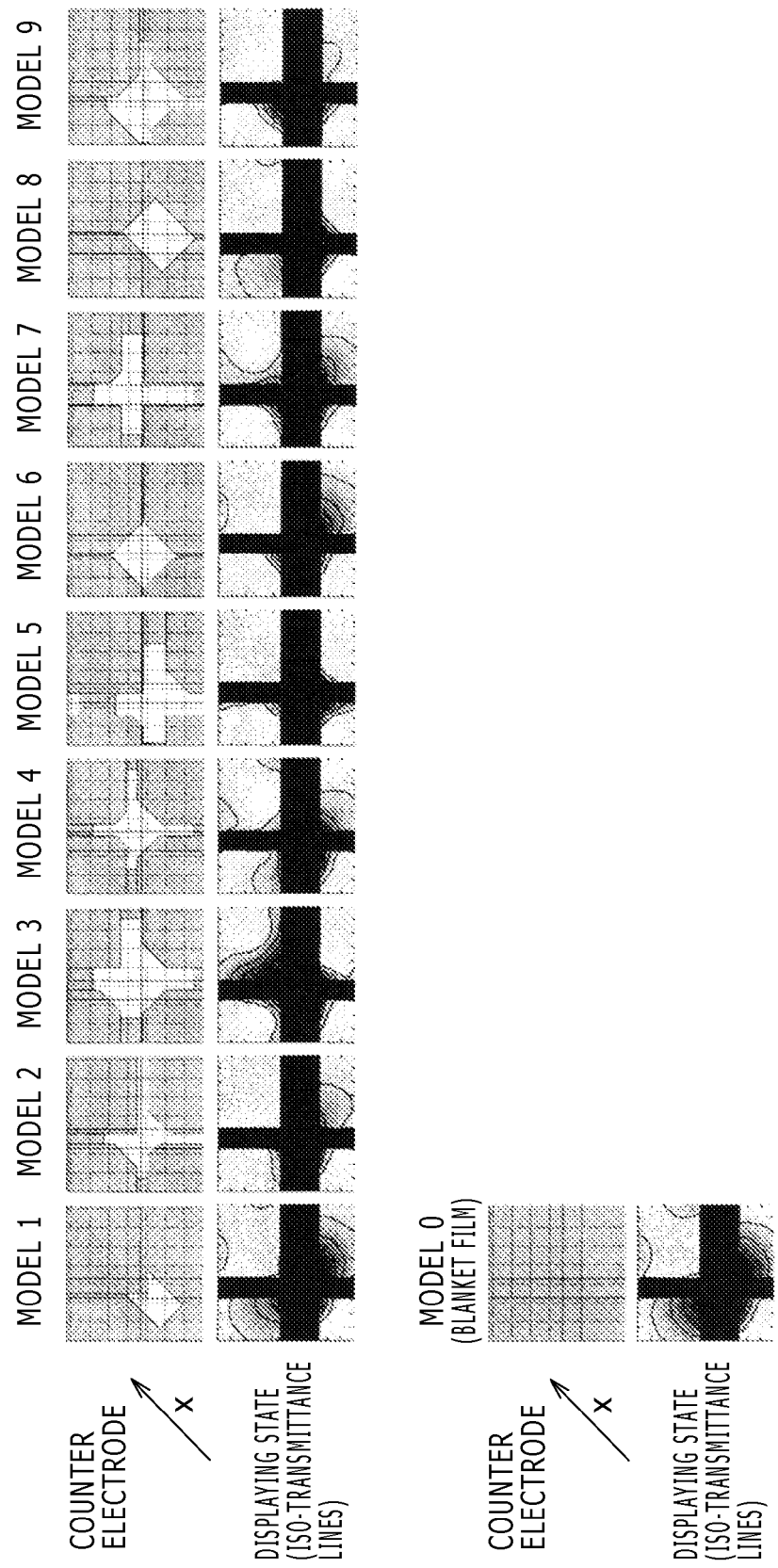
FIG. 5 is a diagram showing results of simulation of the displaying states of Models 1 to 9 having different planar shapes of an aperture pattern when a voltage is applied between a pixel electrode and a counter electrode.

FIG. 5 shows the displaying states of Models 1 to 9 when a voltage is applied between a pixel electrode and a counter electrode. Among Models 1 to 9, the planar shape of an aperture pattern is different from each other. Transmittance lines are also shown in the respective diagrams for Models 1 to 9. In the diagrams of the counter electrodes of Models 1 to 9, the aperture patterns are indicated as white areas. The diagram for Model 0 shows the displaying state when the counter electrode is a blanket film.

Comparison of Models 1 to 9 proves that in Models 6 and 8, the occurrence of an area involving an optical transmittance decrease is effectively suppressed. In Models 6 and 8, the planar shape of the aperture pattern a is a substantially rectangular shape or substantially square shape formed of four sides substantially perpendicular or substantially parallel to the alignment direction x of the alignment layer. In particular, the comparison proves that the occurrence of an area (domain) involving an optical transmittance decrease is more effectively suppressed in Model 8, in which the column spacer 4 is provided near the center of the aperture pattern a. Thus, it is confirmed that the occurrence of a domain can be effectively suppressed by, as described with FIG. 2, providing the aperture pattern a that has a substantially rectangular shape or substantially square shape formed of the sides a1, a2, a3, and a4 substantially perpendicular or substantially parallel to the alignment direction x of the alignment layer, and disposing the column spacer 4 at the center of the aperture pattern a.

Figure 6:
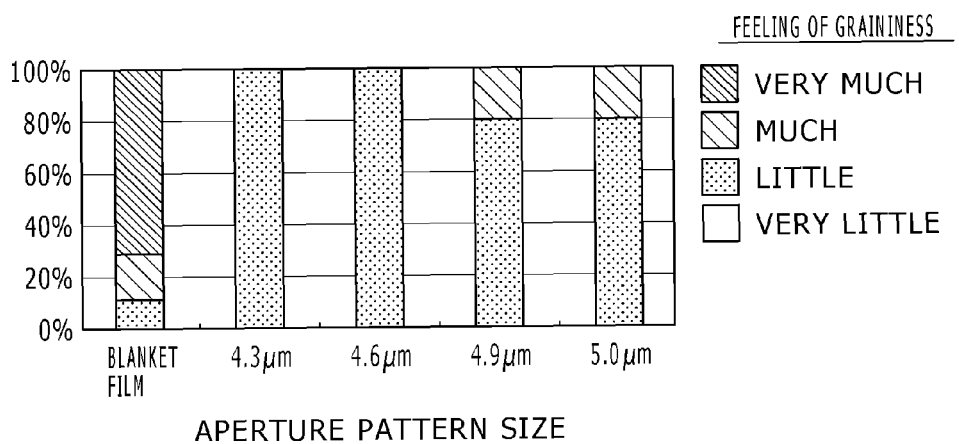
FIG. 6 is a diagram showing results of tests of a displaying characteristic (the degree of plane graininess) of liquid crystal display devices having different aperture pattern sizes.

The occurrence of a domain leads to differences in the optical transmittance on a pixel basis, which causes graininess of displayed images. FIG. 6 shows results of tests of a displaying characteristic (feeling of graininess), carried out regarding the several aperture patterns a having the configuration described with FIG. 2 and different sizes (the lengths of the sides a1, a2, a3, and a4). In the tests, the distance d between the pixel electrodes 24 was set to 1.0 µm, the diameter r of the column spacer 4 was set to 1.5 µm, and the column spacer 4 was disposed at the center of the aperture pattern a.

FIG. 6 proves that the provision of the aperture pattern in the counter electrode allows displaying with less feeling of graininess compared with in the case where the counter electrode is a blanket film. Furthermore, it is proven that the effect of preventing the occurrence of graininess differs depending on the size of the aperture pattern a. According to FIG. 6, under the configuration shown in FIG. 2, a favorable displaying state involving less graininess can be achieved when the size of the aperture pattern a is about 4.3 µm to 4.6 µm.

Figure 7:
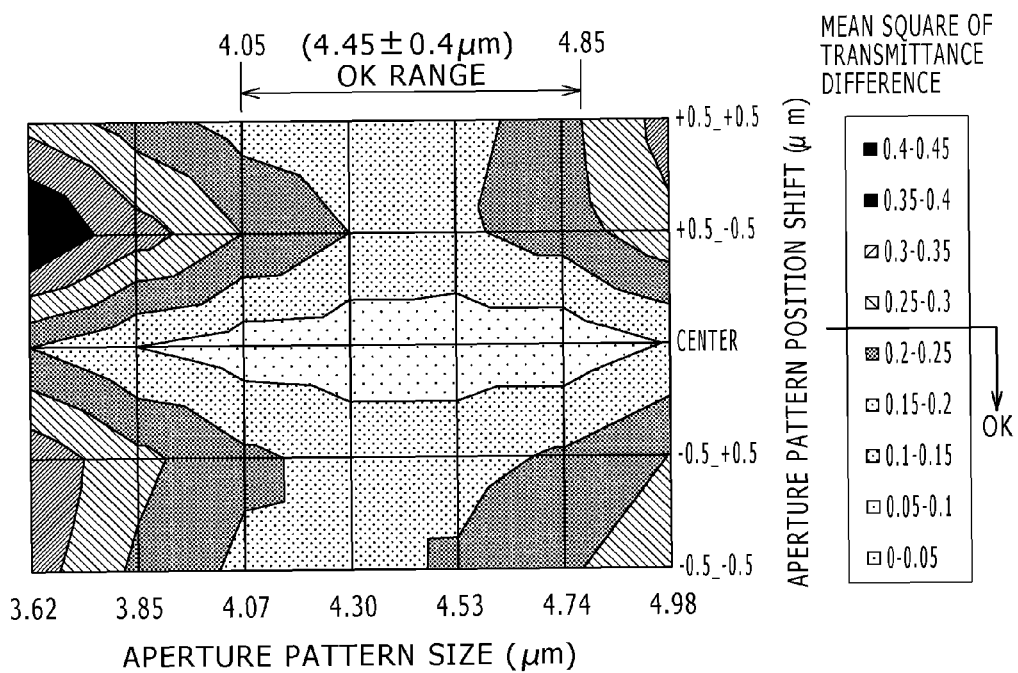
FIG. 7 is a diagram showing the mean square value of a luminance difference as a function of the size of an aperture pattern and the amount of a position shift from a column spacer.

FIG. 7 shows the amount of variation in the optical transmittance in a pixel plane as a function of the size of the aperture pattern a (the length of the sides a1, a2, a3, and a4) and the shift amount (X, Y) of the position of the aperture pattern a with respect to a column spacer. The amount of variation in the optical transmittance is indicated as the mean square value of the optical transmittance difference with respect to the pixel center.

According to FIG. 7, it is confirmed that if the position shift amounts along the X- and Y-directions (X, Y) are in a range of (−0.5, −0.5) to (+0.5, +0.5), when the size of the aperture pattern a is in a range of 4.05 to 4.85 (4.45±0.4) µm, the advantage of the first embodiment is achieved and thus favorable displaying with an optical transmittance variation amount of 0.25 or less is permitted. When the counter electrode is a blanket film, the optical transmittance variation amount is as large as 0.9.

The shape, size, and placement state of the aperture pattern a described above with FIGS. 5 to 7 are factors that are adequately set depending on the shape and placement state of the column spacer 4. Adequate setting of these factors allows the advantage of the first embodiment to be achieved more surely. For example, a corner of the aperture may have a round part, and a side of the aperture does not have to be a straight line. Furthermore, the size of the aperture may be adequately adjusted depending on the size of a column spacer. Moreover, it is also possible to dispose the aperture pattern a over a part having no column spacer thereon.

As described above, the liquid crystal display device 1 of the present embodiment has a configuration in which the aperture patterns a are provided in the counter electrode 32, which is formed as a blanket film in general, and the column spacers 4 are enclosed in the aperture patterns a as described with FIGS. 1 and 2. This configuration can prevent adverse effects on the pixel displaying due to disturbance in liquid crystal alignment around the column spacers 4. This feature can realize sharp image displaying involving no feeling of graininess, while keeping the in-plane uniformity of the distance (gap) between the substrates 2 and 3 by use of the column spacers 4. Furthermore, due to this feature, it is also possible to enhance the displaying quality of a high-definition liquid crystal display device of which pixel electrode size is 18 μm or less.

It will be apparent that the present invention is not limited to the configuration of the above-described embodiment but various kinds of modifications, improvements and combinations are available.

For example, in the above-described configuration, the column spacers 4 are provided on the drive substrate 2. However, the column spacers 4 may be provided on the counter substrate 3 as long as the positional relationship between the pixel electrodes 24 and the aperture patterns a in the counter electrode 32 is ensured. In this case, the column spacers 4 provided over the second substrate 31 of the counter substrate 3 are covered by the alignment layer 33.

In addition, if the light-shielding pattern 22 as a black matrix is provided not only in the drive substrate 2 but also in the counter substrate 3, an effect of shielding elements such as thin film transistors provided in the drive substrate 2 from light is achieved. Also in this case, it is preferable that the aperture patterns a in the counter electrode 32 be provided in a range overlapping with the light-shielding pattern. If the aperture patterns a are positioned to overlap with the light-shielding pattern 22, it is possible to achieve an effect of hiding, by the light-shielding pattern 22, disclination that will be possibly observed slightly even when the aperture patterns a are provided. The light-shielding pattern may be provided in at least one of the drive substrate 2 and the counter substrate 3.

When there is a margin of space for design of interconnects, contact parts, and so on of the pixel circuits, the aperture ratio can be increased by reducing the size of the black matrix (light-shielding pattern), and thus the transmittance can be further improved.

Moreover, in order to enhance the transmittance, the liquid crystal display device 1 may be provided with micro lenses for collecting external light. The micro lenses are provided on the counter substrate 3, on which external light is incident. It can be expected that the optical transmittance can be further enhanced through the combining of the micro lenses.

In the above-described embodiment, the liquid crystal display device 1 has a configuration in which liquid crystal molecules are vertically aligned when no voltage is applied thereto and white is displayed when a voltage is applied thereto. However, the embodiment can be widely applied to liquid crystal display devices having a configuration in which the gap between substrates sandwiching a liquid crystal layer is controlled by use of column spacers, and can offer the same advantage. The advantage can be achieved more surely by adequately setting the shape, placement state, and size of the aperture patterns a with respect to the column spacers depending on the configuration of the liquid crystal display device.

Second Embodiment

A description will be made below about the configuration of a projection-type liquid crystal display device that employs liquid crystal panels each formed as the liquid crystal display device 1 of the above-described first embodiment as its light valves as a second embodiment of the present invention.

Figure 8:
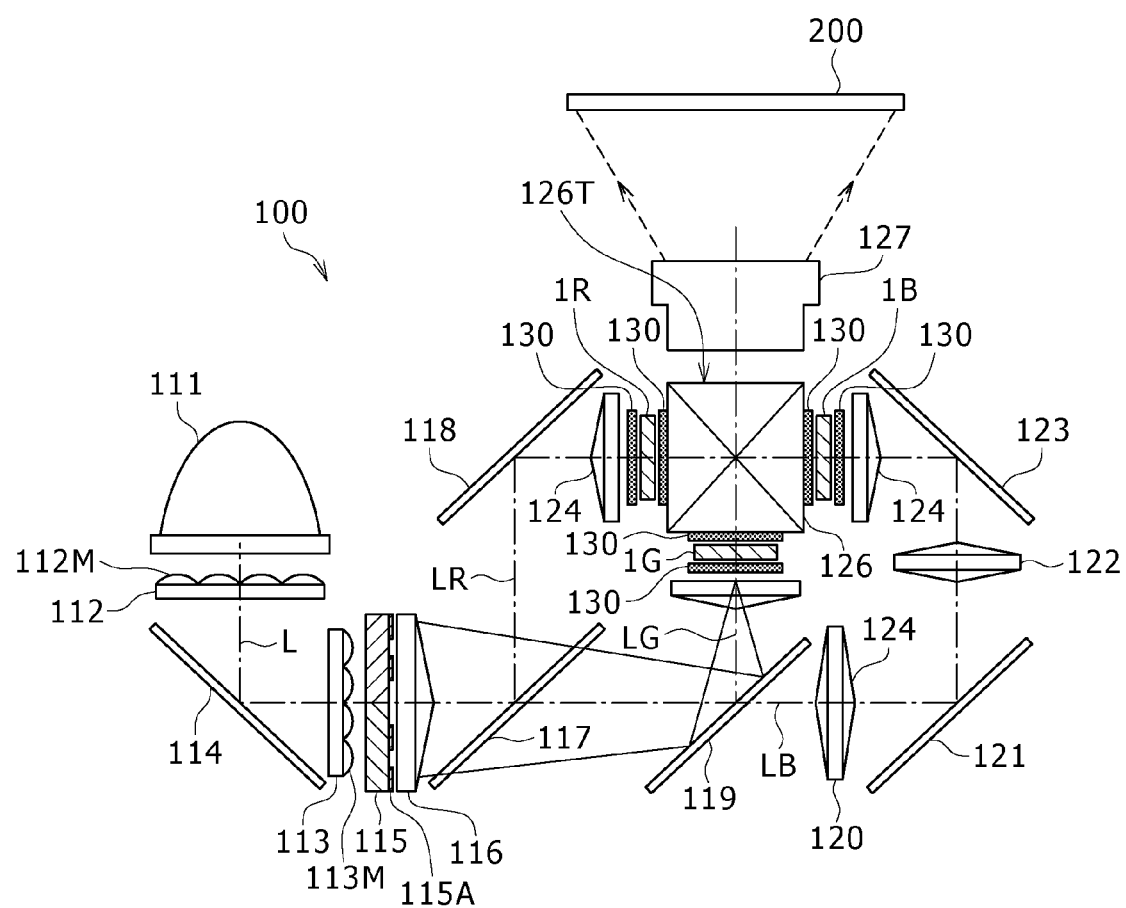
FIG. 8 is a diagram showing the configuration of a liquid crystal display device according to a second embodiment of the invention.

A liquid crystal projector 100 shown in FIG. 8 is a so-called three-lens projector, which separates light from a light source into light of the three primary colors of red, blue, and green, and displays color images by use of one liquid crystal display panel for each of the colors. In the liquid crystal projector 100, the liquid crystal display devices 1 (liquid crystal panels) having the configuration described in the first embodiment are provided as light valves corresponding to the three primary colors. Hereinafter, for convenience of explanation, the liquid crystal display devices on which red light, green light, and blue light are incident will be referred to as a liquid crystal panel 1R, a liquid crystal panel 1G, and a liquid crystal panel 1B, respectively.

The liquid crystal projector 100 includes a light source 111 that emits light and a first lens array 112 disposed on the light-emission side of the light source 111. The liquid crystal projector 100 further includes a mirror 114 that reflects light output from the first lens array 112 to thereby change the optical path (optical axis 110) of the output light by 90°, and a second lens array 113 receives the light reflected by the mirror 114.

The light source 111 emits white light including red light, blue light, and green light, which are necessary for color image displaying. The light source 111 includes a light emitter (not shown) that emits white light and a reflector that reflects and condenses light L emitted from the light emitter. As the light emitter, e.g. a lamp such as an ultra-high-voltage mercury lamp, halogen lamp, metal halide lamp, or xenon lamp is used. It is desirable for the reflector to have a shape offering high condensing efficiency. For example, it has a rotationally-symmetrical concave shape such as a spheroidal shape or the shape of a paraboloid of revolution. The emission point of the light emitter is disposed at the focal point of the concave-shape reflector.

In the first lens array 112 and the second lens array 113, plural micro lenses 112M and 113M are two-dimensionally arranged. The first lens array 112 and the second lens array 113 are to offer uniform illumination distribution of light, and have a function to separate incident light into plural small light beams. Between the light source 111 and the first lens array 112, a UV (Ultra Violet)/IR (Infrared) cut filter (not shown) may be provided.

The mirror 114 is a total reflection mirror preferably.

White light emitted from the light emitter in the light source 111 is converted into substantially parallel light by the reflector, and then passes through the first lens array 112 to reach the total reflection mirror 114. The white light of which optical axis 110 has been bent by 90° by the total reflection mirror 114 enters the second lens array 113.

The liquid crystal projector 100 includes, on the light-output side of the second lens array 113, a PS synthesis element 115, a condenser lens 116, and a dichroic mirror 117.

On the PS synthesis element 115, plural retarders 115A are provided at the positions corresponding to the positions between adjacent micro lenses of the second lens array 113. One example of the retarder 115A is a half-wave retarder. The PS synthesis element 115 separates incident light into polarized light beams having a P-polarized component and an S-polarized component. The PS synthesis element 115 outputs one of two polarized light beams resulting from the separation, from the polarized-light conversion element 115, with the polarization direction thereof (e.g. the P-polarization) kept as it is. Furthermore, the PS synthesis element 115 converts the other polarized light beam (e.g., the S-polarized component) into another polarized component (e.g., a P-polarized component) by the operation of the half-wave retarder 115A, and outputs the converted light beam.

The light output from the PS synthesis element 115 is condensed by the condenser lens 116, and then reaches the dichroic mirror 117. Of the incident light, e.g. red light LR is reflected by the dichroic mirror 117 while the light of the other colors passes through the dichroic mirror 117, so that the incident light is subjected to color separation into the red light LR and the light of the other colors.

Along the optical path of the red light LR arising from the color separation by the dichroic mirror 117, the liquid crystal projector 100 further includes a mirror 118, a field lens 124, and the liquid crystal panel 1R interposed between two polarizers 130.

A total reflection mirror is used as the mirror 118 preferably. The total reflection mirror 118 reflects the red light LR arising from the color separation by the dichroic mirror 117 toward the liquid crystal panel 1R interposed between the polarizers 130.

As described above, of the red light LR incident from the total reflection mirror 118, the light with the vibration direction corresponding with the polarization axis of the input-side polarizer 130 passes through this input-side polarizer 130. The liquid crystal panel 1R has the same configuration as that of the liquid crystal display device described with FIGS. 1 and 2, and spatially modulates the red light LR incident thereon via the input-side polarizer 130 in accordance with input image data. Of the modulated red light LR from the display panel 1R, the light with the vibration direction corresponding with the polarization axis of the output-side polarizer 130 passes through this output-side polarizer 130.

The liquid crystal projector 100 includes a dichroic mirror 119 along the optical path of the light of the other colors arising from the color separation by the dichroic mirror 117. Of incident light, e.g. green light LG is reflected by the dichroic mirror 119 while blue light LB passes through the dichroic mirror 119, so that the incident light is subjected to color separation into the green light LG and the blue light LB.

Along the optical path of the green light LG arising from the color separation by the dichroic mirror 119, a field lens 124 and the liquid crystal panel 1G interposed between two polarizers 130 are disposed.

As described above, of the green light LG incident from the dichroic mirror 119, the light with the vibration direction corresponding with the polarization axis of the input-side polarizer 130 passes through this input-side polarizer 130. The liquid crystal panel 1G has the same configuration as that of the liquid crystal display device described with FIGS. 1 and 2, and spatially modulates the green light LG incident thereon via the input-side polarizer 130 in accordance with input image data. Of the modulated green light LG from the display panel 1G, the light with the vibration direction corresponding with the polarization axis of the output-side polarizer 130 passes through this output-side polarizer 130.

Along the optical path of the blue light LB arising from the color separation by the dichroic mirror 119, a relay lens 120, a mirror 121, a relay lens 122, a mirror 123, a field lens 124, and the liquid crystal panel 1B interposed between two polarizers 130 are provided.

The mirrors 121 and 123 are total reflection mirrors preferably. The total reflection mirror 121 reflects the blue light LB incident thereon via the relay lens 120 toward the total reflection mirror 123. The total reflection mirror 123 reflects the blue light LB, which reaches the mirror 123 via the relay lens 122 after being reflected by the total reflection mirror 121, toward the liquid crystal panel 1B interposed between two polarizers 130.

Of the blue light LB incident from the total reflection mirror 123, the light with the vibration direction corresponding with the polarization axis of the input-side polarizer 130 passes through this input-side polarizer 130. The liquid crystal panel 1B spatially modulates the blue light LB, which enters the liquid crystal panel 1B via the field lens 124 and the input-side polarizer 130 after being reflected by the total reflection mirror 123, in accordance with input image data. Of the modulated blue light LB from the display panel 1B, the light with the vibration direction corresponding with the polarization axis of the output-side polarizer 130 passes through this output-side polarizer 130.

At the position of the intersection among the optical paths of the red light LR, the green light LG, and the blue light LB, a cross prism 126 having a function to synthesize the light of these three colors is provided. The cross prism 126 is formed by bonding four right-angle prisms to each other. Three of the right-angle prisms have input planes through which the red light LG, the green light LG, and the blue light LB enter the cross prism 126. The remaining one right-angle prism has an output plane 126T from which light resulting from the synthesis of the light LR, LG, and LB is output.

In the liquid crystal projector 100, the bonding planes of the respective right-angle prisms are coated by dichroic films so that the green light LG incident on the cross prism 126 may pass through the cross prism 126 toward the output plane 126T and the red light LR and the blue light LB incident on the cross prism 126 may be reflected toward the output plane 126T.

Based on this configuration, the cross prism 126 synthesizes the three-color light LR, LG, and LB incident on the respective input planes, and outputs the resultant light from the output plane 126T.

Furthermore, the liquid crystal projector 100 includes also a projection lens 127 for projecting the synthesized light output from the cross prism 126 toward a screen 200. The projection lens 127 is formed of plural lenses preferably, and has a zoom function for adjusting the size of an image projected to the screen 200 and a focus function.

In the liquid crystal projector (liquid crystal display device) 100 having the above-described configuration according to the second embodiment, the liquid crystal display devices (liquid crystal panels) having the configuration described in the first embodiment are used as light valves.

In recent projection-type liquid crystal display devices employing liquid crystal display devices as its light valves, the pixel size is becoming smaller year by year for resolution enhancement and cost reduction, so that currently the pixel size is as small as 18 μm or less. By using the liquid crystal display devices (liquid crystal panels) having the configuration described in the first embodiment for the thus miniaturized projection-type liquid crystal display device, if there is a margin of space for design of interconnects, contact parts and so on, the aperture ratio can be increased by reducing the size of a light-shielding part, and thus the transmittance can be further improved.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device with a plurality of pixels comprising:
   a drive substrate including more than one pixel electrode;
   a counter substrate including a counter electrode common to a plurality of said pixels, the counter substrate and the drive substrate positioned so that the pixel electrodes and the counter electrode face each other;

apertures in the counter electrode below said counter substrate and formed by removal of respective portions of the counter electrode;

spacers, each of which correspond to an aperture, the spacers interposed between the drive substrate and the counter substrate;

a first alignment layer on the counter electrode;

a second alignment layer on the pixel electrodes and the spacers; and a liquid crystal layer sealed between the drive substrate and the counter substrate, wherein, the spacers are configured in a columnar shape, a portion of the spacer extends into the aperture, and the aperture has a shape that is larger than the portion of the spacer that extends into the aperture such that there is space in-between the interior sidewalls of the aperture and the entire portion of at least one edge of said spacer that extends into the aperture.

2. The liquid crystal display device according to claim 1, wherein the spacers are provided among the pixel electrodes.

3. The liquid crystal display device according to claim 1, wherein the spacers are disposed at centers of the apertures.

4. The liquid crystal display device according to claim 1, wherein each of the apertures has a substantially square shape in plan view.

5. The liquid crystal display device according to claim 4, wherein four sides of the square shape of the apertures are substantially perpendicular or substantially parallel to an alignment direction of the second alignment layer.

6. The liquid crystal display device according to claim 5, wherein the second alignment layer is a vertical alignment layer.

7. The liquid crystal display device according to claim 1, wherein the apertures are provided in a range overlapping with a light-shielding pattern that is provided in at least one of the drive substrate and the counter substrate.

8. The liquid crystal display device according to claim 1, further comprising:

a light source; and a projection lens configured to project light from the output from the liquid crystal panel.

* * * * *

UNITED STATES PATENT AND TRADEMARK OFFICE
CERTIFICATE OF CORRECTION

PATENT NO. : 7,852,448 B2
APPLICATION NO. : 11/756887
DATED : December 14, 2010
INVENTOR(S) : Yasuhiro Shirasaka et al.

Page 1 of 1

It is certified that error appears in the above-identified patent and that said Letters Patent is hereby corrected as shown below:

On the Title page of the patent:

Item (75) Inventors: "Yumiko Tatemori, Kangawa (JP)";

should be

Item (75) Inventors: --Yumiko Tatemori, Kanagawa (JP)--

Signed and Sealed this
Fifteenth Day of March, 2011

David J. Kappos
*Director of the United States Patent and Trademark Office*